Aug. 12, 1958 J. L. VAUGHAN 2,847,298
METHOD OF PRODUCING REFRACTORY METALS
Filed July 2, 1954

INVENTOR.
James L. Vaughan
BY
Oliver W. Hayes
ATTORNEY

United States Patent Office 2,847,298
Patented Aug. 12, 1958

2,847,298

METHOD OF PRODUCING REFRACTORY METALS

James L. Vaughan, Needham, Mass., assignor to National Research Corporation, Cambridge, Mass., a corporation of Massachusetts Application July 2, 1954, Serial No. 441,108

6 Claims. (Cl. 75—84.5)

This invention relates to the production of metals and more particularly to the production of metals such as titanium in the form of large crystals.

A principal object of the present invention is to provide novel apparatus and process for producing high yields of relatively large crystals of a metal from a fused salt bath containing a compound of the metal.

Another object of the invention is to provide such apparatus and process for producing large crystals of titanium from fused salt solutions of a titanium compound.

Other objects of the invention will in part be obvious and will in part appear hereinafter.

For a fuller understanding of the nature and objects of the invention, reference should be had to the following detailed description, taken in connection with the accompanying drawings wherein.

Figures 1, 3:
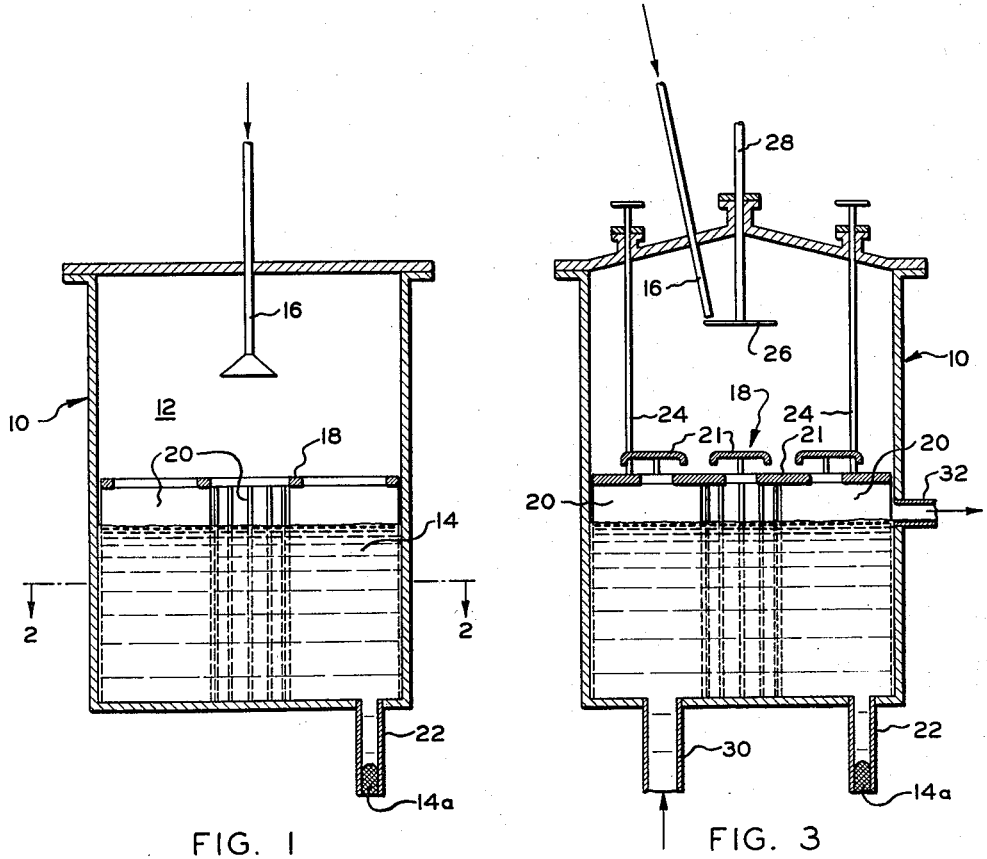
Fig. 1 is a diagrammatic, schematic illustration of one preferred embodiment of the invention.
Fig. 3 is a diagrammatic, schematic illustration of another embodiment of the invention.

The present invention is useful in the production of those metals which can be formed as large crystals by the action of a reducing agent on a compound of the metal in a fused salt bath. The metal compound is dissolved at least in part in the bath and the bath is maintained quiescent during at least the early stages of crystal growth.

The present invention provides a mechanism for promoting crystal growth in such a system in the form of a grid structure which, at least in substantial part, lies within the molten salt bath. The elements forming the grid may be thin plates or vanes which in effect subdivide the portion of the bath in which the grid extends into a multiplicity of separate crystal-growing cells. Alternatively, the grid may consist of or comprise substantially regularly spaced rods. The elements of the grid may all be arranged in planes normal to the surface of the bath or they may be in part parallel or at other angles to such surface.

The elements of the grid are preferably held in relatively fixed position in the bath and they provide, at spaced intervals through the bath, supports to which the metal may adhere as it forms. This is an important function, as it has been found that effective growth of metal crystals appears to require the presence of stable supporting structure to which the metal can adhere as it forms, the crystals growing outwardly from the structure or from initially formed metal adhered to the structure and, ultimately, if the supports are not too far apart, interlacing as a network which becomes itself a crystal growth bed or support from which the crystals grow at random. Furthermore, if, as is preferred, the grid structure projects above the surface of a bath to which the reducing agent is supplied and the grid is formed of a material which is readily wettable by the reducing agent, it forms a means by which the reducing agent may be preferentially introduced below the surface of the bath along the surfaces of the grid elements by the wetting action of the reducing agent thereon. Thus the feed of reducing agent tends to be concentrated in the area of the grid elements from which crystal growth occurs and the production of unsupported metal fines is minimized. This effect may be obtained if the reducing agent is fed as a layer or film to the surface of the bath through which surface the grid projects, but it is most effectively utilized if the reducing agent be fed either preferentially or entirely by means of wetting of the grid portion external to the bath.

When the reducing agent is fed to the surface of the bath, there may initially form over the surface of the bath a more or less spongy layer of metal fines. This sponge adheres to the grid elements at the surface of the bath and is thus stabilized to serve as a further supporting bed from which crystal growth may occur. This sponge layer may also act as a distributor of reducing agent to the crystal-growing area at its lower surface by means of wetting action of the reducing agent on the metal particles of the sponge.

In addition, to its functions in promoting crystal growth, since the grid provides a bed structure from which crystal growth occurs and to which the crystals are adhered, it may be utilized to facilitate the subsequent separation of the crystals from the salt bath. Thus the grid is preferably removable from the reactor and, upon completion of the process, the bath may be drained from the reactor, leaving essentially only the crystalline metal on the grid which, upon cooling, may be removed and the crystalline metal separated therefrom.

For convenience, the invention will be further described as applied to the production of large titanium crystals in a fused salt solution of a titanium halide by controlled feeding of a reducing agent to the solution, a process to which the invention has particularly useful application. The titanium halide is preferably a lower titanium chloride (e. g., $TiCl_2$ or $TiCl_3$) dissolved in fused sodium chloride and the reducing agent is preferably sodium.

In one preferred method of practicing the invention, a portion of the grid extends above the salt bath and sodium is sprayed onto the surface of the bath and to that portion of the grid which extends above the bath. This sodium forms a thin crust of sintered fine titanium particles on the surface of the bath, the titanium crust being supported by adhering to the grid. In order to perform this supporting function, it is preferred that the minimum horizontal spacing between the various portions of the grid to which the crust is adhering be no greater than about one foot. This is due to the fact that the crust is relatively weak and will collapse under the weight of subsequently formed titanium if the spacing spanned by the crust is too great. If the grid surface be such that the sodium has a wetting affinity therefor, the sodium will thereby migrate down into the bath along the submerged grid surface where it reacts with the dissolved titanium chloride to form titanium on the surface of the grid. The initial partially sintered titanium crust formed on the surface of the bath and on the surfaces of the grid has an enormous surface area. This enormous titanium surface area is believed to serve as an excellently wettable surface for feeding more sodium below the surface of the salt by the wetting action of the sodium thereon. The additional sodium travels down the titanium surface on the grid to form more titanium as the sodium reaches molten salt containing dissolved titanium chloride. Thus the grid and the supported titanium sponge serve to feed the sodium from its point of introduction in the system to the point where the sodium atoms can reduce titanium chloride molecules to titanium atoms at the surface of a crystal-forming nucleus of titanium. It is believed that, since the titanium atoms are formed at the solid titanium crystal face, they readily fall into the titanium crystal lattice to provide for the relatively rapid growth of large crystals of titanium.

Figure 2:
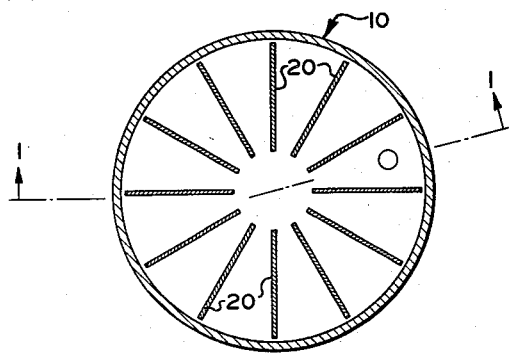
Fig. 2 is a schematic view along 2—2 of Fig. 1.

Referring now to Figs. 1 and 2, there is illustrated one preferred type of equipment employed in the present invention. The reactor generally comprises a metallic pot 10 defining a reaction chamber 12 therewithin. As illustrated, the reaction chamber includes a charge 14 of fused salt which may be a titanium chloride dissolved in sodium chloride. The reactor also includes a sodium feed tube 16 through which a slow, measured feed of liquid sodium may be accomplished. The grid, generally indicated at 18 as comprising a plurality of radially extending plates 20, is positioned so as to extend into the fused salt and also to extend above the surface of the fused salt so as to be contacted by sodium fed to the surface of the fused salt. The particular arrangement of these plates 20 is shown best in Fig. 2, which is a section taken along the line 2—2 in Fig. 1. The reactor 10 is also preferably provided with a drain 22 which contains a frozen plug 14a of the fused salt.

In operating the device of Figs. 1 and 2, a small amount of sodium chloride may be initially added to the reactor so as to provide the salt plug 14a and also to furnish some salt to cover the bottom of the reactor. Thereafter, sodium and titanium tetrachloride are preferably fed into the reactor, the titanium tetrachloride entering below the salt surface through an inlet (not shown) and the ratio of the feed of the two reactants being such that a mixture of titanium dichloride and titanium trichloride dissolved in sodium chloride is the product of the reaction. When the requisite amount of lower titanium chloride dissolved in fused salt has been created in the reactor, the titanium tetrachloride feed is stopped and the sodium feed is continued. The sodium is fed to the surface of the fused salt, being spread out as much as possible by means such as a spray nozzle or the like. The sodium on the surface of the reactor almost immediately depletes the surface stratum of the salt of its titanium chloride content and forms a crust of sintered titanium fines along the surface, this crust adhering to, and being supported by, the grid 18. At the same time, the sodium wets the grid plates 20 and runs down these plates, producing titanium metal on the wetted surface. This forms a thin layer of sintered titanium sponge on the immersed surfaces of the grid plates. The sponge parallel to the surface of the fused salt bath and the sponge which is on the immersed surfaces of the grid plates has an extremely high effective surface area and, consequently, it is readily wet by the molten sodium. Thus this initially formed sponge, even though very thin, may serve as an excellent mechanism for continuing the introduction of the sodium below the surface of the fused salt by the wetting action of the sodium thereon. This sodium spreads across the total titanium surface in the salt bath and reduces the remainder of the dissolved titanium dichloride to titanium metal at the surface of the previously formed titanium. As a result of this wetting action and reduction of titanium lower chloride at the surface of the existing titanium, the resultant product is in the form of relatively large titanium crystals which adhere to the previously formed titanium. When substantially all of the titanium chloride has been reduced to metallic sodium, the frozen plug 14a is melted and the by-product sodium chloride is allowed to drain from the reactor. The grid 18, carrying the titanium sponge and crystals therewith, is then lifted from the reactor where it can be leached in very dilute acid. Any excess sodium is preferably removed from the crystal mass prior to the leaching step by sweeping the crystal mass with argon or other inert gas while the crystal mass is at an elevated temperature so as to provide a relatively high partial pressure of sodium vapor. The argon sweeping can be achieved by bubbling the argon through the molten salt containing the sodium prior to draining the reactor or the argon can be run through the reactor after the salt content thereof is drained. In any case, it is preferred that the argon be recycled through a condenser for the sodium so as to maintain a low partial pressure of sodium vapor in the recycled argon.

In the Fig. 3 embodiment of the invention (where like numbers refer to like elements of Figs. 1 and 2), the apparatus is modified somewhat by providing a double layer of laterally extending plates 21 on the grid 18. The purpose of these plates is to prevent direct impingement of the introduced sodium on the surface of the salt bath to minimize top crust formation. These plates 21 are preferably formed of titanium, nickel or the like and are arranged in a staggered fashion so that the sodium can travel downwardly by wetting action but not in a straight path. A pair of lifting rods 24 is also preferably connected to the grid 18 for lifting the grid free of the bath of sodium chloride. This reactor also includes an atomizer disc 26 carried on a shaft 28 for spreading the introduced sodium in very fine droplets throughout the top surface of the plates 21. In the use of the Fig. 3 device, the introduced sodium wets the double layer of horizontal plates 21. From these plates 21, it runs downwardly by wetting action and gravity to vertical plates 20 and thence into the salt bath. The titanium chloride-sodium chloride solution is preferably fed to the bottom of the reactor 10 through a pipe 30. Sodium chloride, nearly completely stripped of titanium chloride content, is allowed to overflow continuously from the reactor through a pipe 32 so as to maintain the salt bath level substantially constant during the course of the run. When the grid 18 has been completely filled with titanium crystals, it may be removed from the salt bath and replaced by another similar grid by suitable lock means (not shown). Whenever desired, the reactor can be suitably drained, in a manner similar to that described in connection with the Fig. 1 embodiment, by means of salt plug 14a.

In order to illustrate the invention in more detail, there are set forth below several non-limiting examples of preferred methods of practicing the invention.

*Example 1*

The reactor pot consisted of a nickel chamber having a diameter of 12 inches and a height of 27 inches. The reactor had a water-cooled head and was equipped with a stirrer for agitating the salt bath therein. Two feed tubes were provided for feeding liquid titanium tetrachloride and liquid sodium to the reactor. Temperatures were indicated by thermocouples positioned within the salt charge. The reactor contained a twelve-plate grid, the plates being radially positioned around the stirrer shaft. Each plate had a size of 3.5 inches by 15 inches. At the beginning of the second stage of the reduction operation, each plate was immersed 10½ inches so that 4½ inches extended above the surface of the salt bath. At the end of the run, only ½ inch extended above the surface of the salt bath. An atmosphere of argon was maintained in the reactor during the run. 30 pounds of sodium chloride were charged into the reactor, all air was removed from the reactor and an atmosphere of argon was introduced therein. Sodium and titanium tetrachloride were introduced for one hour at the rates of 7.4 pounds and 37.3 pounds respectively so as to produce a solution of titanium dichloride and trichloride in sodium chloride. The initial reduction was carried out at a temperature of about 900° C. wth agitation of the bath. The introduction of titanium tetrachloride was then stopped and sodium was fed to the surface of the salt bath at the rate of 5.1 pounds of sodium per hour. This corresponded to a rate of sodium feed of 6.5 pounds per square foot of salt bath surface per hour. This feed was continued for 2½ hours. During this time, the bath was allowed to remain substantially quiescent, although some slight thermal currents may have been present. The bath was maintained at a temperature of about 900° C. for 10 hours after cessation of the sodium feed. The charge was allowed to cool and the resultant product was leached by means of a jet of refrigerated acidified water.

The jet leaching mentioned in Example I is preferably carried out in an inert atmosphere and the temperature of the acidified water leach is preferably maintained below about 20° C. by recycling the water through a refrigeration system. The frozen salt cake is preferably suspended over the leach jet so that the leach water, after impingement on the salt cake surface, will drain rapidly away from this surface. The jet preferably has a velocity in excess of about 10 feet per second and, in the above example, had a velocity of 25 feet per second so as to rapidly erode the frozen salt cake containing the titanium. During this jet leaching, the pH of the leach water is preferably maintained at 5 or slightly below so as to dissolve any unreduced titanium chlorides present in the reaction mass.

*Example II*

This run was carried out under almost the same conditions as those applying in Example I except for the fact that the sodium feed rate was only 2 pounds per hour during the second-stage reduction (e. g., during the reduction of the sodium chloride solution of titanium trichloride and dichloride). This feed rate was continued for 6½ hours with no holding time after the cessation of the sodium feed.

While specific types of grids have been illustrated in the drawings, numerous modifications thereof may be employed. The grid can be wire mesh, screening, a preformed sponge, wire wool, or can take numerous other shapes providing a relatively large surface area. Equally, the grid can be totally immersed under the salt bath surface. In this case, a portion of the grid is preferably sufficiently close to the surface of the bath so as to support the initial titanium crust that is formed when the reducing agent is fed to the surface of the bath. To serve this function, it is not essential that the grid extend up to the surface, particularly when the distance spanned by the initial crust is not too great. Accordingly, the grid can be a few inches below the surface so as to support the crystals growing downwardly from the initial crust and thus prevent collapse of this crust. Equally, the sodium feed can be accomplished by means of a tube, for example, extending down to a limited portion of the submerged grid. In any case, it is preferred that the grid be formed of a metal which does not form an alloy with either the reducing agent or the titanium which melts below the desired temperature of operation of the fused salt bath.

Numerous alternative methods of performing the specific experimental runs illustrated above may be employed without departing from the spirit of the invention. The temperature of the reaction mass may be widely varied from slightly above the melting point of the salt to temperatures on the order of 1000° C. and above. Numerous reducing agents other than the sodium can be employed, for example, potassium, calcium, magnesium, lithium and various combinations of these elements may be utilized. From the standpoint of cheapness, sodium, sodium-potassium alloy or magnesium are preferred. Other halides of titanium may be utilized, although, from the standpoint of cost, ease of handling, etc., the tetrachloride is preferred.

Additionally, the reactor can be fed with lower halides of titanium such as titanium trichloride manufactured from titanium-bearing materials in the manner shown in the copending applications of Singleton, Serial No. 304,388, filed August 14, 1952, now Patent No. 2,770,541, granted November 13, 1956, and Singleton, Serial No. 315,461, filed October 18, 1952, now abandoned. Equally, titanium trichloride can be made by the technique described by Sherfey et al., Journal of Research of the Bureau of Standards, 46, 299–300, April 1951. Additionally, the dichloride of titanium can be manufactured by numerous processes such as disproportionation of the trichloride or partial reduction of the trichloride or tetrachloride.

The present invention can be equally employed for the manufacture of titanium alloys by the coreduction of the chlorides, for example, of zirconium, vanadium, chromium, manganese, iron, nickel, cobalt, columbium, tantalum, molybdenum, tungsten or silicon. The alloy may be a binary alloy or it may be an alloy containing three or four constituents. In the manufacture of alloys, the same general conditions of the reduction of the titanium halide and reducible compounds of the alloying constituents must be employed. Accordingly, when used in the claims, the word "titanium" is intended to mean alloys thereof as well as the pure metal.

While the invention has been particularly described in connection with the production of titanium, it is also applicable to the production of other refractory metals suc as zirconium, vanadium, columbium, tungsten, tantalum, molybdenum and the like by the reduction of reducible compounds such as the halides of such refractory metals dissolved in suitable fused salts. It should be additionally pointed out that the salt mixture in which the reduction is carried out may be formed of numerous halides which can be mixed halides, single halides and halides of materials other than the specific reducing agent or agents employed in the reaction. From the standpoint of simplicity of operation and ease of control, however, it is preferred that the salt be the chloride of the reducing agent. It is quite feasible to employ binary and ternary mixtures of halides having quite low melting points.

It should be pointed out, in connection with a consideration of the various salts which can be employed, that these salts should be completely anhydrous and free of any contaminants such as carbon, nitrogen, oxygen or hydrogen. This is particularly true when making metals such as titanium due to the tremendous reactivity of titanium metal at temperatures on the order of 800° C.–900° C. and above.

In the above specification, reference has been made particularly to the preferred titanium chlorides, tetrachloride and dichloride. In most instances, the trichloride is equally useful and, as a matter of fact, it is extremely unlikely that any system having an appreciable concentration of one of the lower chlorides of titanium will not have at least some of the other lower chloride also present. It should be apparent that one can also employ the corresponding di-, tri- and tetra-halides from the group consisting of the iodides, bromides and fluorides of titanium.

Since certain changes may be made in the above process and apparatus without departing from the scope of the invention herein involved, it is intended that all matter contained in the above description, or shown in the accompanying drawing, shall be interpreted as illustrative and not in a limiting sense.

What is claimed is:

1. In a process for manufacturing a refractory metal selected from the class consisting of titanium, zirconium, vanadium, columbium, tungsten, tantalum and molybdenum, wherein a substantial quantity of a halide of said refractory metal is dissolved in a bath of a molten salt which is inert to said halide and the dissolved refractory metal halide is reduced to refractory metal by means of a reducing agent comprising at least one metal from the class consisting of the alkali metals and the alkaline earth metals magnesium and calcium, the improvement which comprises positioning a grid in the bath so that at least a portion of the grid is below the surface of the molten salt bath, and feeding molten reducing agent to the grid over an extended period of time.

2. The process of manufacturing titanium which comprises immersing a metallic grid into a molten salt bath containing a substantial quantity of titanium dichloride, said molten salt being inert to the titanium dichloride and the titanium dichloride being dissolved in the molten salt, feeding sodium to a portion of the grid extending above the surface of the molten salt bath to cause the sodium to travel below the bath surface by wetting the surface of the grid, the sodium serving to reduce titanium chlorides to titanium metal which adheres to the grid, separating the grid and the molten salt bath to permit drainage of salt from the grid, removing excess sodium from the titanium carried by the grid by sweeping the titanium mass with an inert gas while the titanium is at an elevated temperature, and removing residual salt from the titanium.

3. In a process for manufacturing titanium wherein a solution of a lower chloride of titanium in a molten salt is reduced to metallic titanium by means of sodium, the molten salt comprising at least one halide selected from the group consisting of the alkali metal halides and the alkaline earth metal halides, the improvement which comprises positioning a grid of extended area in the molten salt so that a major portion of the grid is below the surface of the molten salt, and spraying sodium across the surface of the molten salt over an extended period of time.

4. In a process for producing crystalline refractory metal selected from the class consisting of titanium, zirconium, vanadium, columbium, tungsten, tantalum and molybdenum, wherein a substantial quantity of a halide of said refractory metal is dissolved in a bath of a molten salt which is inert to said halide and the dissolved refractory metal halide is reduced to refractory metal by means of a reducing agent from the class consisting of the alkali metals and the alkaline earth metals magnesium and calcium, the improvement which comprises positioning a supporting grid structure of extended area in the molten salt bath so that the grid structure extends both below and above the surface of the bath, said structure having a surface freely wettable by said reducing agent at the temperature of the bath, and feeding said reducing agent to the surface of the bath and to the grid structure above the bath over an extended period of time.

5. In a process for manufacturing titanium wherein a solution of a halide of titanium in an inert molten salt is reduced to metallic titanium by means of a reducing agent comprising at least one metal from the class consisting of the alkali metals and the alkaline earth metals magnesium and calcium, the improvement which comprises positioning a grid so that it extends generally horizontally across the molten salt and under the surface of the molten salt for supporting a crust of titanium fines, and spraying the reducing agent across the surface of the molten salt.

6. In a process for manufacturing titanium wherein a solution of a halide of titanium in an inert molten salt is reduced to metallic titanium by means of a reducing agent comprising at least one metal from the class consisting of the alkali metals and the alkaline earth metals magnesium and calcium, the improvement which comprises positioning a grid so that it extends generally horizontally across the molten salt and under the surface of the molten salt for supporting a crust of titanium fines, providing a plurality of surfaces extending downwardly through the surface of the molten salt towards the grid structure which supports the titanium crust, and spraying the reducing agent across the surface of the molten salt.

References Cited in the file of this patent

UNITED STATES PATENTS

| | | |
|---|---|---|
| 2,170,394 | Von Zeppelin | Aug. 22, 1939 |
| 2,205,854 | Kroll | June 25, 1940 |
| 2,274,237 | Jaeger et al. | Feb. 24, 1942 |
| 2,385,843 | Rennie | Oct. 2, 1945 |
| 2,545,821 | Lindsley et al. | Mar. 20, 1951 |
| 2,564,337 | Maddex | Aug. 14, 1951 |
| 2,586,134 | Winter | Feb. 19, 1952 |
| 2,618,549 | Glasser et al. | Nov. 18, 1952 |
| 2,697,660 | Seibert | Dec. 21, 1954 |
| 2,708,158 | Smith | May 10, 1955 |